United States Patent [19]

Toyama et al.

[11] Patent Number: 4,694,149

[45] Date of Patent: Sep. 15, 1987

[54] FOCUS ADJUSTING DEVICE

[75] Inventors: Masamichi Toyama; Susumu Kozuki, both of Tokyo, Japan

[73] Assignee: Canon Kabushiki Kaisha, Japan

[21] Appl. No.: 805,986

[22] Filed: Dec. 5, 1985

[30] Foreign Application Priority Data

Dec. 7, 1984 [JP] Japan ............................... 59-257496
Dec. 7, 1984 [JP] Japan ............................... 59-257497
Dec. 7, 1984 [JP] Japan ............................... 59-257498

[51] Int. Cl.⁴ .................... G01J 1/20; G01C 3/08; G03B 3/00

[52] U.S. Cl. ............................... 250/201; 250/211 R; 354/404; 356/4

[58] Field of Search .................. 250/201 AF, 201 PF, 250/201 DF, 201 R, 204, 211 R, 237 R, 578; 354/404, 406, 407, 408; 356/1.4

[56] References Cited

U.S. PATENT DOCUMENTS 4,591,919  5/1986  Kaneda et al. ............... 250/201 AF

FOREIGN PATENT DOCUMENTS 0397754  2/1974  U.S.S.R. ............................... 250/237

Primary Examiner—Edward P. Westin
Assistant Examiner—Charles Wieland
Attorney, Agent, or Firm—Toren, McGeady & Associates

[57] ABSTRACT

In a focus adjusting device having a light projecting source for projecting distance measuring light onto an object, a light sensing element divided into a plurality of light sensing areas for sensing the light reflected by the object, and a control member for controlling a lens to be at an in-focus position based on a signal from the light sensing element, a boundary line between the divided light sensing areas of the light sensing element is formed with a number of straight lines or curves, so that the boundary is comb-tooth formed or saw-tooth formed in such a manner that a part of one divided area is positioned in the other divided area.

9 Claims, 29 Drawing Figures

FOCUS ADJUSTING DEVICE

BACKGROUND OF THE INVENTION

1. Field of the Invention

The present invention relates to an automatic focus adjusting device, and more particularly to an active type automatic focus adjusting device in which infrared light is projected onto an object and the light reflected by the object is sensed by a differential type senser to carry out automatic focus adjustment.

2. Description of the Prior Art

Below, various prior art automatic focus adjusting devices of this kind (hereinafter called "AF device") will be explained with reference to FIGS. 1 to 7.

FIG. 1 shows, in general, a construction of an example of the AF device.

In association with the movement of a lens group 1 taking part in an focusing operation in a photographic lens system, a light projecting element 3, consisting of a laser diode, a near-infrared ray emitting diode and so on, projects a light spot onto an object 5 through a light projecting lens 4. The light reflected by the object 5 is received by a light sensing element 8, having two divided areas 8A and 8B consisting of PIN photodiodes, charge-coupled devices and so on, through a light receiving lens 6 and a visible light cut filter 7. The light sensing element 8 also moves in association with the movement of the lens group 1. A distance to the object 5 is detected by a control circuit (hereinafter called "AF circuit") 10 by means of an output of the light sensing element 8 so as to control the driving of a focusing lens group driving motor 9 and set the lens group 1 at an in-focus position, so that an image of the object 5 is formed sharply on an image forming plane 2 of an image pickup tube (or an image forming plane of an image pickup element, or film, in another type camera) by the photographic lens system including the lens group 1.

In the light sensing element 8 in the case of this AF device, the area 8A is arranged at the side near the light projecting element 3, and the area 8B is arranged at the side distant from the element 3.

In a distance measuring operation of the AF device shown in FIG. 1, assuming that when the object 5 has a distance l2 from the image forming plane 2, as is shown in FIG. 2(a), reflected light of a light spot image S is received by the light sensing element 8, with the same light quantity on the two areas 8A and 8B. In this case, in the light sensing element 8, the difference $VA-VB$ between an integration value $VA$, which is obtained by integrating an output of the area 8A with reference to time, and an integration value $VB$, which is obtained by integrating an output of the area 8B with reference to time, is nearly zero. As to an optical path, light projected by the light projecting element 3 reaches the object 5 via an optical path b1, and the light reflected by the object 5 forms an image on the light sensing element 8 via an optical path b2. Now, suppose that the lens group 1 is at an in-focus position and the object 5 moves forward to have a distance l1. Then, the in-focus position of the lens group 1 shifts backward and a far-focus condition is assumed. On the other hand, if the light projecting element 3 and the light sensing element 8 are positioned as they stand, projected light reaches the object 5 through the optical path b1, and the light diffused and reflected by the object 5 forms an image on the light sensing element 8 through an optical path b'2, so that, as shown in FIG. 2(b), the position of the formed light spot image S is largely deviated to the side of the area 8B and the difference $VA-VB$ does not equal zero. According to the sign of $VA-VB$, the AF circuit 10 drives the motor 9 to rotate in the normal or reverse direction based on the sign of the difference $VA-VB$ so as to advance or withdraw the lens group 1. When, as mentioned above, the difference $VA-VB$ is negative, the lens group 1 is advanced.

Now, suppose that when, in FIG. 1, the lens group 1 has been advanced to the position 1', an image of the object 5 having the distance l1 is formed sharply on the image forming plane 2. In association with the lens group 1, the light projecting element 3 and the light sensing element 8, move to the positions 3' and 8' respectively, by means of cams and so on (not shown). Then, a projected light path becomes a1 and a refrected light path becomes a2. As a result, as is shown in FIG. 2(a), the light spot image S moves to the median position between the areas 8A and 8B on the light sensing element 8. At this time, the difference $VA-VB$ becomes almost zero, and the motor 9 stops. On the other hand, when the object 5 moves to have a distance l3, the lens group 1 moves in the reverse direction so as to carry out the focusing operation until the difference $VA-VB$ becomes zero. The projected light path and the reflected light path in this case are shown with c1 and c2.

FIGS. 3 to 6 respectively show examples of the conventional AF devices carrying out the distance measuring on the same principle as that of the device shown in FIG. 1. The AF devices differ in the form of a light projecting system and a light sensing system from the device shown in FIG. 1. Hereby, members having the same reference numerals as those in FIG. 1 are the same members.

In the device shown in FIG. 3, the light projecting element 3 projects a light spot onto the object 5 through the focusing lens group 1 via the light projecting lens 4 and a prism 11 having a reflecting plane 11a composed of a cold mirror arranged in a photographic light path, and the light reflected by the object 5 is received by the light sensing element 8 arranged outside of the camera through the light receiving lens 6 and the visible light cut filter 7. Namely, the device is of the so-called half-TTL distance measuring type, in which the light projecting element 3 and the image forming plane 2 are arranged in the optically conjugate positions with each other. The focusing lens group 1 is moved by the motor 9 which is controlled by the AF circuit 10, mechanically in association with the light sensing element 8.

In the device shown in FIG. 4, the light projecting element 3 projects a light spot onto the object 5 through the focusing lens group 1 via the light projecting lens 4 and the reflecting plane 11a of the prism 11 arranged in the photographic light path, and the light reflected by the object 5 is received by the light sensing element 8 through the light reflecting lens 6 and the visible light cut filter 7 via the focusing lens group 1 and a reflecting plane 11b of the prism 11. Namely, the device is of the so-called TTL distance measuring type, in which the light projecting element 3 and the light sensing element 8 are arranged in optically conjugate positions with the image forming plane 2, and a projected light beam and a sensed light beam pass at the positions distant from each other near the periphery of the pupil of the lens group 1.

Hereby, the light projecting element 3 and the light sensing element 8 are fixed, and, therefore, the mechanical association thereof with the photographic lens is not required.

The device shown in FIG. 5 is a modification of the device shown in FIG. 4, in which the reflecting plane 11a of the prism 11 is formed such that a projected light beam coincides with the photographic optical axis.

In the AF device shown in FIG. 6, the same light projecting system as that shown in FIG. 4 is used, and an image pickup element 14 is used as a light sensing element operative for both adjusting the focus and picking up the image. An image signal produced by the image pickup element 14 is divided by a distributing circuit 12 to be supplied to the AF circuit 10 and an image pickup circuit 13.

FIG. 7 shows a light sensitive plane of the image pickup element 14 of the device shown in FIG. 6. When it is used for focus detection, signals from two zones 14A and 14B are supplied to the AF circuit 10 by the distributing circuit 12. Therefore, it is necessary that, during distance measurement, an infrared ray should reach the image pickup element 14 and that, during image pickup operation, the infrared ray should be excluded.

In the preceding conventional examples, the device shown in FIG. 1 has a merit such that because the light projecting lens 4 and the light receiving lens 6 are arranged outside of the photographic lens group 1, it is possible to make the light projecting lens 4 and the light receiving lens 6 large so that light can reach longer distance. However, it is inconvenient that the device, on the whole, cannot be made compact. On the other hand, the device shown in FIG. 4 has the merits and demerits reverse to that shown in FIG. 1. Furthermore, the highly precise mechanical association of the photographic lens group 1 with the light projecting and receiving systems is not required, so that the construction can advantageously be simplified.

The device shown in FIG. 3 has the intermediate character between that shown in FIG. 1 and that shown in FIG. 4.

In the case of the device shown in FIG. 5 in comparison with the type shown in FIG. 4, the length of the base line of the light projecting and receiving systems is short. It is not convenient in obtaining the distance measuring accuracy, and, however, like the device shown in FIG. 3, a projected light beam is conveniently situated at the center of the view finder even in the out-of-focus condition. Hereby, in the case of all of the preceding devices, the image of the light spot formed on the object 5 by the light projecting element 3 is formed on the optical axis of the photographic lens in the infocus condition. Namely, the distance measuring zone of all the preceding devices is at the center of the view finder, so that the AF device free from parallax, can be realized.

Furthermore, in the case of the device shown in FIG. 6, a light sensing area of the image pickup element 14 operating as an AF light sensing element is equal to a light receiving area of the photographic lens, so that, as compared with other types of the devices, a larger light sensing area can be obtained. It is advantageous from the point of view of the light reaching distance.

Furthermore, in the case of the device shown in FIG. 6, a signal produced by the image pickup element 14 is divided to be supplied to the AF circuit 10 and the image pickup circuit 13. In practice, this division is carried out time-divisionally, so that the device of this type is suited for a system such as a still video camera in which distance measurement is completed prior to exposure. However, since the conventional devices are constructed as mentioned above, an object whose reflection factor in the infrared range is even can be focused correctly, while an object which has different reflection factors in the infrared range is inconveniently accompanied with distance measurement error (hereinafter called "contrast blur").

Below, the contrast blur will be explained with reference to FIGS. 8(a)-8(g) and 9(a) and 9(b).

In FIG. 8(a), S is an infrared ray spot image on the light sensing element 8. The radius of the spot image S is assumed 1. A hatched portion at the left-hand side of the spot image S is a part reflected by an object whose infrared ray reflection factor is k1, while the right-hand side portion is a part reflected by an object whose infrared ray reflection factor is k2. Now, define $k = k2/k1$, and k assuming the value $1 - \infty$. Abscissa l in FIGS. 8(a) and 8(b) shows the position of the boundary between the parts having different reflection factors, with the geometrical center O of the spots image S assumed as the origin. In the state shown in FIGS. 8(a), G is the center of the signal intensity of the spot image S. A signal in the left-hand side portion of the center G is balanced with a signal in the right-hand side portion. FIG. 8(b) shows the relation of the distance E ($\overline{OG}$) to the position of the boundary of the reflection factor in the abscissa, in the case of $k = 8$. Namely, when the position l of the boundary of the reflection factor is about 0.6, $\overline{OG}$, namely E, assumes the maximum value of about 0.7. It goes without saying that when $l = -1$ or $l = 1$, the spot is being projected onto an object having even reflection factor, and $E = 0$.

Below, a graph representing the distance E of FIG. 8(b) will be explained.

In FIG. 8(c), a circle 101 represents an infrared spot image of an only white object whose reflection factor is high. O represents the geometrical (optical) center of the spot image 101. The abscissa l represents the position of the boundary of the parts having different reflection factors.

FIG. 8(c) shows spot light from an object having even reflection factor, so that the intensity center G1 of the reflection signal coincides with the optical center O. Accordingly, the distance E1 between the reflection signal intensity center G1 and the optical center O is zero.

FIG. 8(d) shows a case where the reflection factor boundary position l is $-0.5$ ($l = -0.5$). A hatched portion is a part having a low reflection factor, while a remaining white portion is a part having a high reflection factor. In this case, the reflection signal intensity center G2 is positioned to the right of the optical center O. The distance between the reflection signal intensity center G2 and the optical center O is E2.

FIGS. 8(e) and 8(f) also show cases where the reflection ratio boundary positions l are 0 ($l = 0$) and $+0.5$ ($l = +0.5$), respectively. The reflection signal intensity centers are G3 and G4, and the distances are E3 and E4, respectively.

In the case FIG. 8(g), the whole of the spot image is covered with a reflecting plane having a low reflection factor. The optical center O coincides with the reflection signal intensity center G5, and the distance E5 is zero. The distances E1–E5 shown in FIGS. 8(c)–8(g) are plotted along the ordinate, and thus obtained points are connected with lines so as to obtain the graph of the distance E in FIG. 8(b).

This distance E is the amount corresponding to the contrast blur, which will be explained with reference to FIGS. 9(a) and 9(b).

FIG. 9(a) corresponds to FIGS. 2(a) and 2(b). When a value (VA−VB)/VA+VB, which is an AF signal in a case where the light spot image S on the light sensing element 8 of the infrared spot projected onto the object having even reflection factor moves relatively through the positions (I)–(II)–(III) from the area 8A to the area 8B on the light sensing element 8, is plotted, the characteristic curve, shown with a solid line in FIG. 9(b), can be obtained. Namely, when the geometrical center O of the light spot image S comes on the boundary line between the areas 8A and 8B of the light sensing element 8, the AF signal becomes zero and, therefore, the contrast blur does not take place.

When, as shown in FIG. 9(a), the AF signal in a case where the light spot image S, consisting of the contrast pattern with $l \approx 0.6$ and $k=8$, relatively moves on the light sensing element 8 through the positions (I)–(II)–(III), is plotted, the AF signal is represented as shown by a broken line in FIG. 9(b), in which the zero-cross position is deviated by $\Delta x$. The light spot image S at the zero-cross position is at the position (II) in FIG. 9(a), while the signal intensity center G is on the boundary line between the areas 8A and 8B of the light sensing element 8. Consequently, the distance E in FIG. 8(a) corresponds to $\Delta x$ in FIG. 9(b), and the AF signal becomes zero at the position at which the spot image S is divided by $\Delta x$ on the light sensing element 8.

Where the length of the base line for triangulation is "bL", the focal length of the light receiving lens is "$f_S$", the focal length of the photographic lens is "f", and the defocus amount on the focal plane is "$\Delta b$", the following condition is obtained:

$$\Delta b = \Delta x \times \frac{f^2}{L \cdot f_s}$$

That is, contrast blur proportional to $\Delta x$ takes place.

When the contrast ratio k becomes larger, the maximum value of the distance E in FIG. 8(b) moves upward to the right, and $\Delta x$ in FIG. 9(b) becomes larger. Accordingly, the contrast blur becomes larger.

SUMMARY OF THE INVENTION

It is, therefore, an object of the present invention to provide a focus adjusting device which presents the contrast blur of an object having different reflection factors.

To attain the above object, the present invention provides a device arranged such that the divided boundary surface of a light sensing element for receiving distance measuring light reflected by the object having different reflection factors is composed with light sensing elements running into each other along the dividing line so as to eliminate the contrast blur caused by the difference of the above reflection factors.

Furthermore, the present invention provides a focus adjusting device which makes use of an optical member instead of making the dividing boundary line of the light sensing elements for eliminating the above contrast blur run into the respective light sensing elements.

DETAILED DESCRIPTION OF THE PREFERRED EMBODIMENTS

Below, the present invention will be explained in detail with reference to the accompanying drawings.

Figure 1:
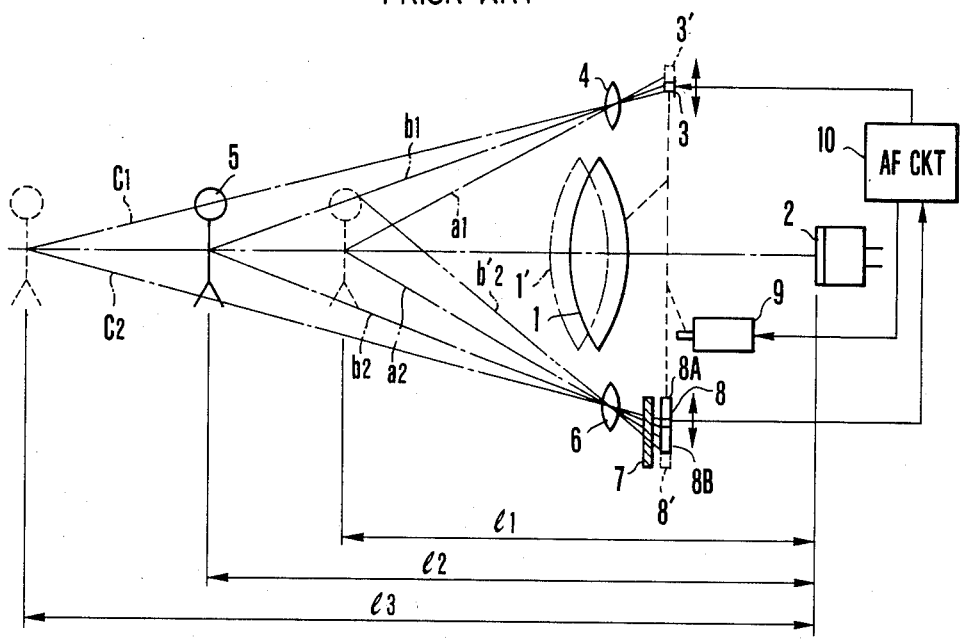
FIGS. 1 to 7 respectively show the construction of the important elements of various conventional focus adjusting devices.
Figure 2A:
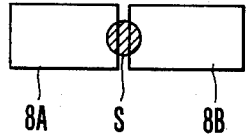
Figure 2B:
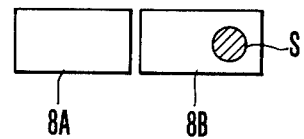
Figure 3:
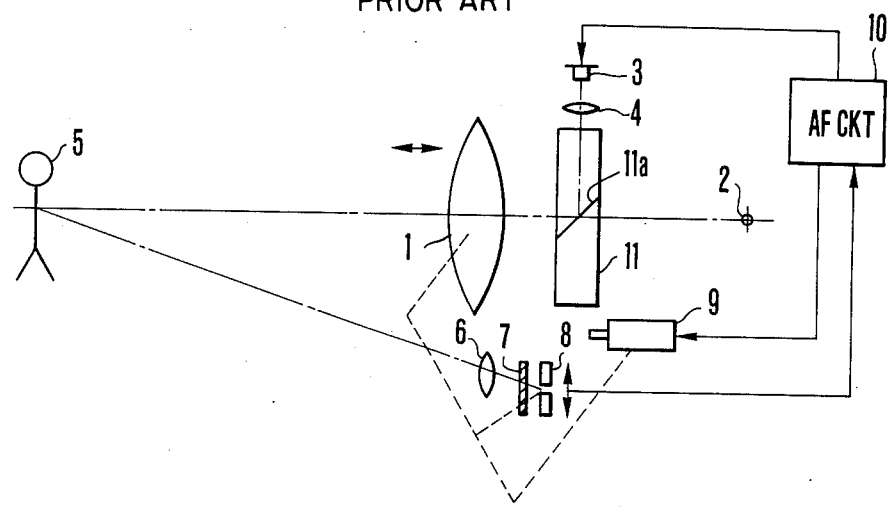
Figure 4:
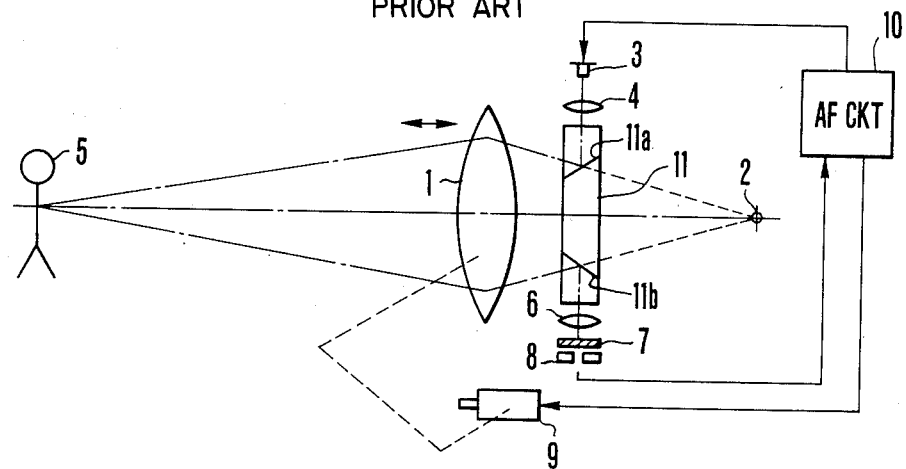
Figure 5:
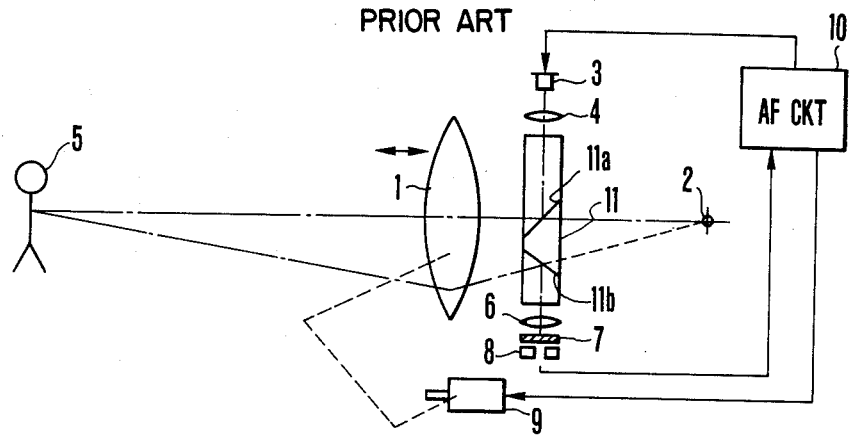
Figure 6:
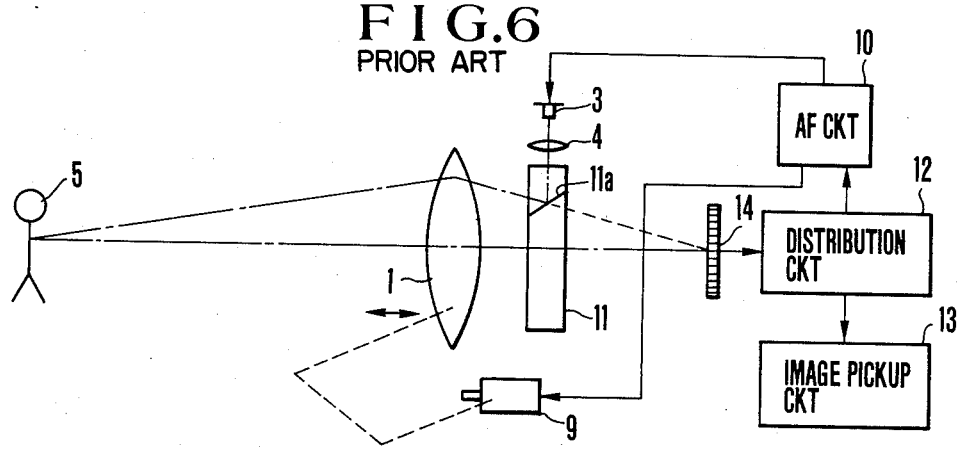
Figure 7:
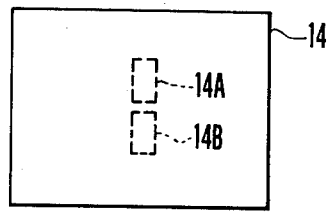
Figure 8A:
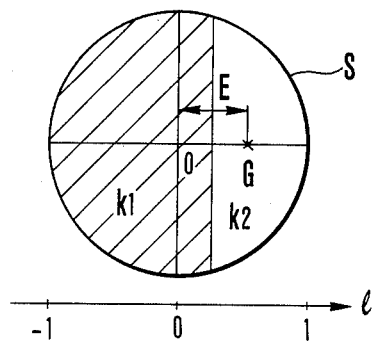
FIGS. 8(a)–8(g) and FIGS. 9(a), 9(b) are graphs explaining the operation of a light sensing element.
Figure 8B:
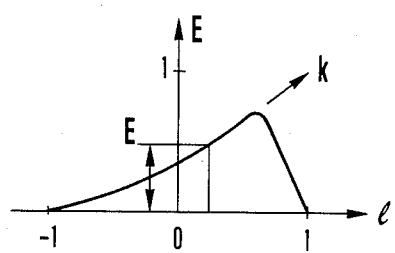
Figure 8C:
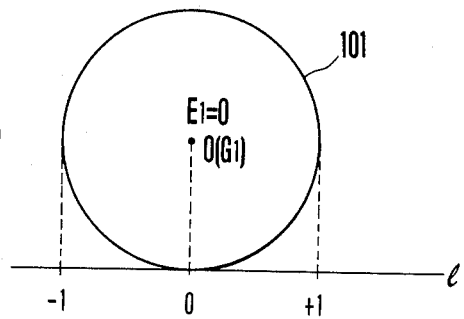
Figure 8D:
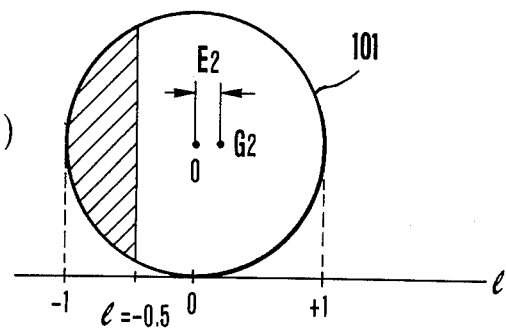
Figure 8E:
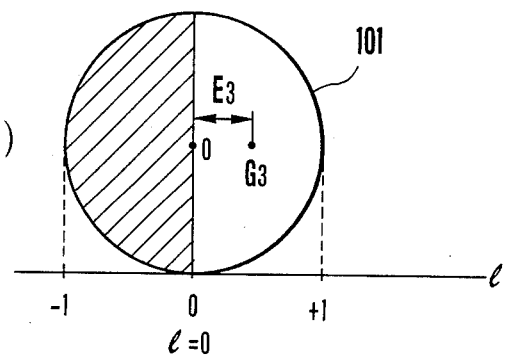
Figure 8F:
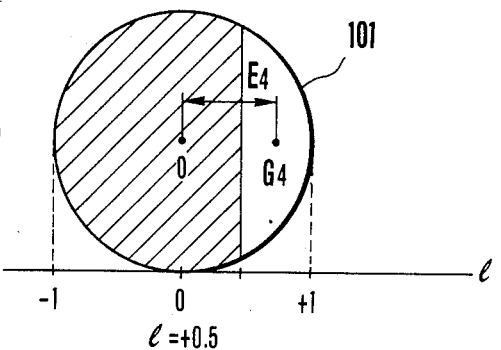
Figure 8G:
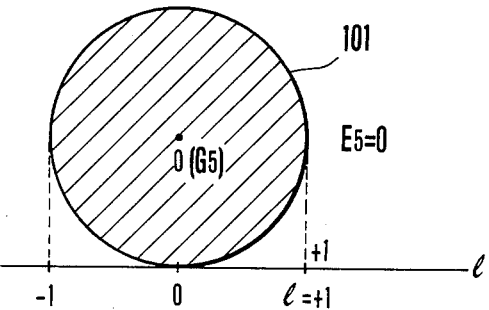
Figure 9A:
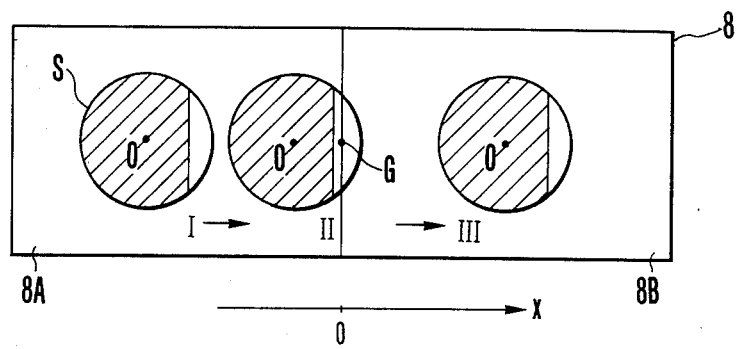
Figure 9B:
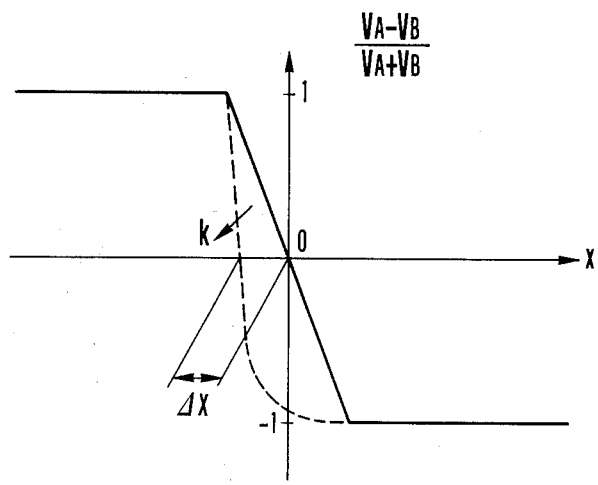
Figure 10A:
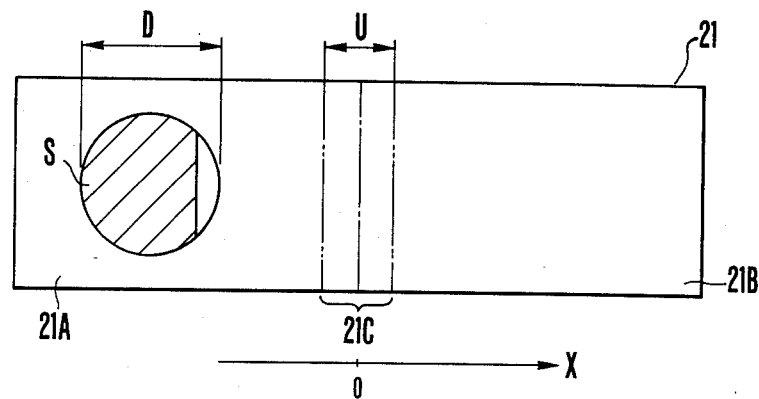
FIGS. 10(a)–10(c) are graphs explaining the dividing effect of the light sensing element of the present invention.
Figure 10B:
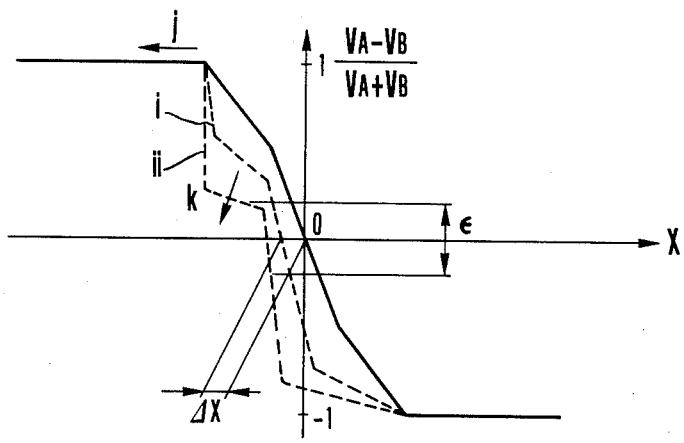
Figure 10C:
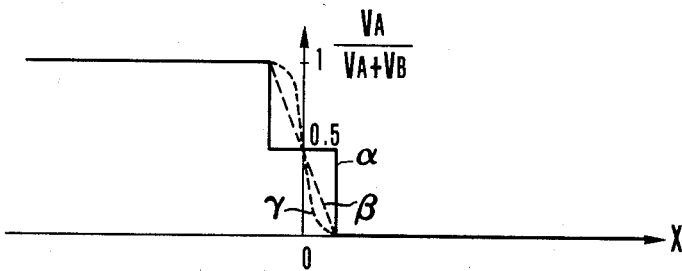

FIGS. 10(a), 10(b) and 10(c) explain the construction of the present invention. FIGS. 10(a) and 10(b) correspond to FIGS. 9(a) and 9(b) of the conventional device.

In a focus adjusting device, according to the present invention, a light spot is projected by a light projecting element onto an object. The light reflected by the object is received by a light sensing element 21 composed of two areas 21A and 21B. An in-focus condition is detected, when output signals produced by the two areas 21A and 21B of the light sensing element 21 are almost equal. With such a construction, besides the two areas 21A and 21B, the light sensing element 21 is provided with a dividing area 21C in which the two areas 21A and 21B run into each other along the boundary line between the two areas 21A and 21B.

Below, the operation will be explained.

In FIG. 10(a), let the width of the dividing area 21C be U, and the ratio of the width U to the diameter D of the spot image S on the light sensing element 21 be $j=U/D$.

FIG. 10(c) shows the meaning of the dividing area 21, representing VA/(VA+VB), when the light spot moves on the areas 21A and 21B of the light sensing element 21 in the direction of x. The characteristics shown by a solid line $a$, is obtained when the light spot is in the dividing area 21C and a signal due to the light spot is divided equally between the areas 21A and 21B. When, in the same way as in the case of FIG. 9(b), (VA−VB)/VA+VB is calculated, the result is as is shown in FIG. 10(b), where $j=0.5$.

In FIG. 10(b), a solid line shows the case of the spot image with even contrast. A broken line i shows the case of the spot image consisting of a contrast pattern with $l \approx 0.6$ and $k=8$. Since the dividing area 21C is provided, $\Delta x$ in this case is about a half as large as when the dividing area 21C does not exist. When the ratio j is made larger so as to reach 1, the absolute value on the abscissa x when (VA−VB)/VA+VB starts to change from 1. When $j=1$, the inclination of (VA−VB)/VA+VB at the zero cross point becomes slow. Namely, the sensitivity of the AF system goes down.

In FIG. 10(b), $\epsilon$ shows a permissible non-sensitive zone of the AF system. Within the zone $\epsilon$, the inclination at least at the zero cross point should be almost equal to that when the dividing area 21C does not exist. Namely, a permissible maximum value of the ratio j exists.

When the ratio k becomes remarkably large as in a case where the light spot is projected onto the end of the object, there appears the characteristic shown by a broken line ii in FIG. 10(b). When the non-sensitive zone ε is zero, no problem takes place. However, the zone ε has a predetermined value in order to secure the stability at the in-focus point. Therefore, when the light spot image moves from the negative side of the abscissa x, a larger AF error takes place than when the dividing area 21C does not exist (hereinafter, this effect is called "enlarging effect"). The larger the ratio j is, the larger the error becomes. From the point of view of this, a maximum value of the ratio j exists.

Then, there is an idea that the dividing pattern of the signal between the areas 21A and 21B in the dividing area 21C of the light sensing element 21 is changed.

A broken line β in FIG. 10(c) shows the case averaged in such a manner that when x=−U/2, VA:VB=100(%):0(%), when x=0, VA:VB=50(%):50(%), and when x=U/2, VA:VB=0(%):100(%).

Namely, the solid line α is for the even dividing type, the broken line β is for the constant dividing change ratio type, and a broken line γ is for the variable dividing change ratio type. Thus, the distance measuring error in a case where the ratio k is large can be made small by changing the dividing characteristics towards the broken line β, γ. However, in this case, the improvement of Δx to the ordinary contrast ratio of about k=8 becomes small, so that it is necessary to increase the ratio j in order to compensate for this.

Consequently, it is necessary to determine the ratio j and the dividing pattern (types such as α, β and γ), taking the non-sensitive zone ε and the ratio k when the enlarging effect takes place (hereinafter called k max) into consideration.

For example, when ε=0.15 and k max=50, j=0.5 in the case of the dividing pattern α, and j≈0.7 in the case of the dividing pattern β.

Below, embodiments for realizing such boundary dividing zone of the light sensing element will be explained.

Figure 11:
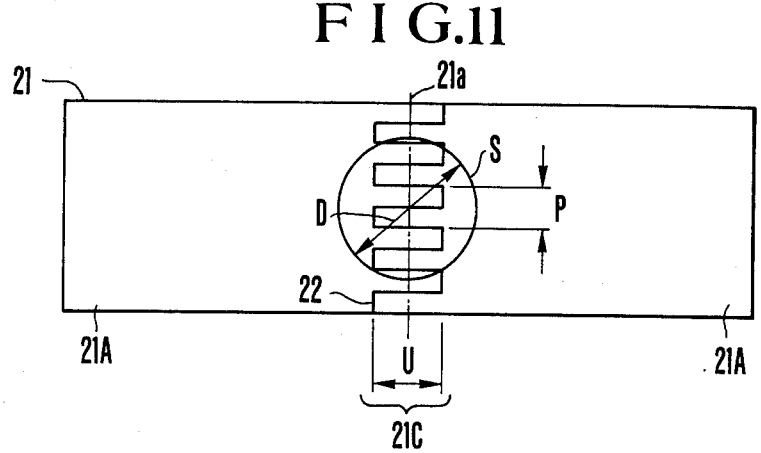
FIGS. 11 to 17 respectively show embodiments of the present invention.

FIG. 11 is a plan view of an embodiment of the light sensing element in the case of the dividing pattern α.

The light sensing element 21 is divided into two light sensing areas 21A and 21B with equal area. A boundary line 22 is formed in a comb-tooth shape with a center line 21a of the light sensing element 21 as the center, such that the light sensing areas 21A and 21B run into each other so as to form the dividing area 21C.

Here, j=U/D=8.5, and P (pitch of the comb-tooth) =0.3D. It is necessary that the pitch P is equal to or smaller than D (P≦D), and the smaller P is preferred.

The reason is that a distance measuring error takes place depending on positions of a contrast pattern in a case where the contrast pattern crosses the boundary line 22 of the areas 21A and 21B at the right angle.

FIGS. 12(a)–12(c) and 13 show the second embodiment of the present invention.

Two areas 121A and 121B of a divided light sensing element 121 are separated with a boundary line 122. In a dividing area making a boundary line portion, namely, a mean value area 121C having a width U, the boundary line 122 is formed in a zigzag pattern with a pitch P. This zigzag pattern divides the light sensing element 121 along a center line 123 between the two light sensing areas 121A and 121B. Apart from FIG. 12(a), a boundary line running from one end 123a to the other end 123b may be made in a zigzag pattern composed of a number of straight lines, curves or a combination of straight lines and curves. Furthermore, a zigzag pattern may be composed of a number of triangles whose bases consist of a line connecting the one end 123a of the boundary line to the other end 123b with the smallest distance (see FIG. 12(c)). It goes without saying that the pitch P must be chosen smaller than the diameter D of the spot images of the reflected light.

The amount of light incident on the substantial center line 123 between the areas 121A and 121B of the light sensing element 121 constructed as mentioned above, is divided equally to the zones 121A and 121B.

Furthermore, {(l+U/2)/U}×100% of the amount of light incident on the side of the area 121A distant from the center line 123 by l, is distributed to the area 121A, and the remaining amount is distributed to the area 121B.

Furthermore, the amount of light incident on areas other than the mean value area 121C is not averaged, so that 100% of the light amount is distributed to one of the area 121A and the area 121B.

Consequently, the reflected light incident on the mean value area 121C is divided to the areas 121A and 121B with weight.

Figure 12A:
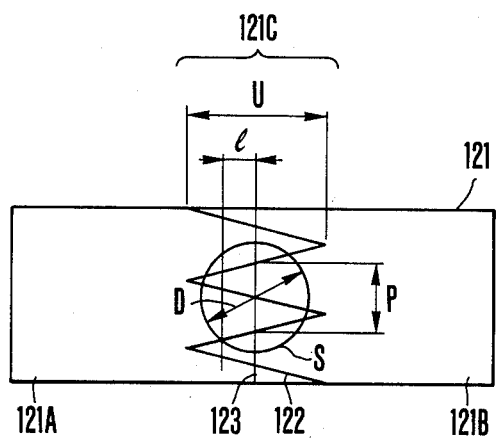
Figure 12B:
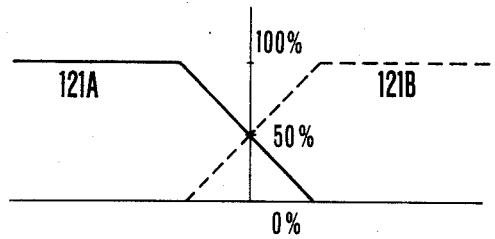
Figure 12C:
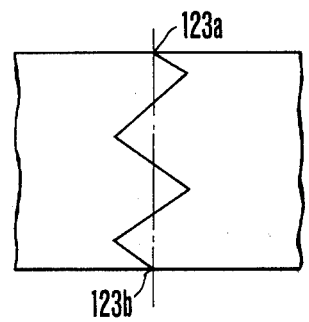
Figure 13:
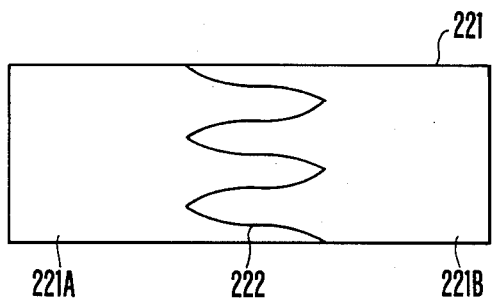

In FIG. 12(a), the boundary line 122 between the areas 121A and 121B of the light sensing element 121 is formed in a primary (linear) zigzag pattern, while FIG. 13 shows a boundary line formed in a zigzag pattern with a secondary mean value compensated curve. This pitch P and areas of the areas 221A and 221B as a whole are the same as in the case of FIG. 12(a).

FIGS. 14–17 show another embodiment of the present invention.

In the case of this embodiment, in front of a light sensing element 321 composed of areas 321A and 321B, an optical member 323 made of a plane glass having an area equal to or larger than that of the light sensing element 321 is arranged. On the surface of the optical member 323, a saw-tooth shaped part having a center line 324, corresponding to a boundary line 322 of the areas 321A and 321B, namely, triangles 325 and 326, having a common base line 324, are formed reciprocally on each side of the line 324. The triangles 325 and 326 are provided with a number of V-grooves 325a, 325b, 325c and 326a, 326b, 326c whose sections in the direction vertical to the line 324 are triangular. Only the incident state of light incident on the boundary line 322 between the areas 321A and 321B of the light sensing element 321 is compensated for.

Then, the operation will be described with reference to FIGS. 16 and 17.

Figure 14:
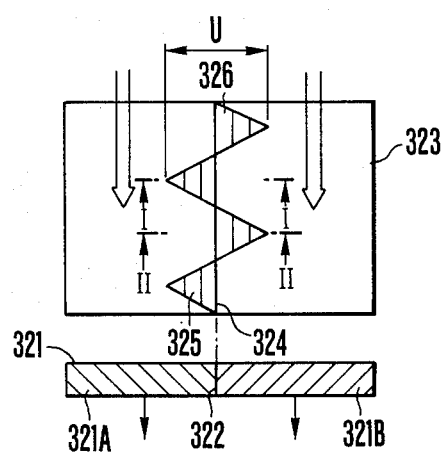
Figure 15:
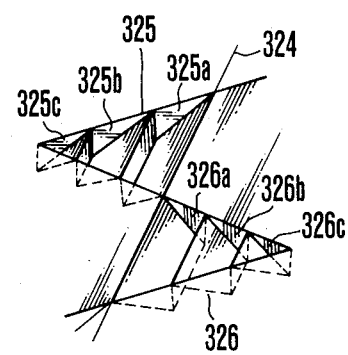
Figure 17:
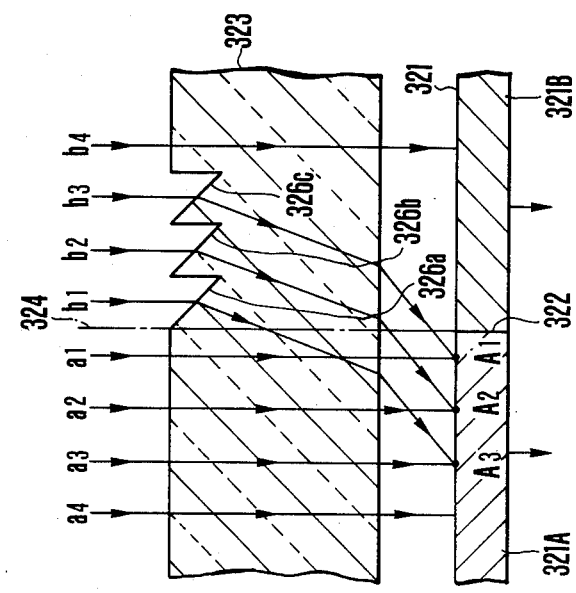
Figure 16:
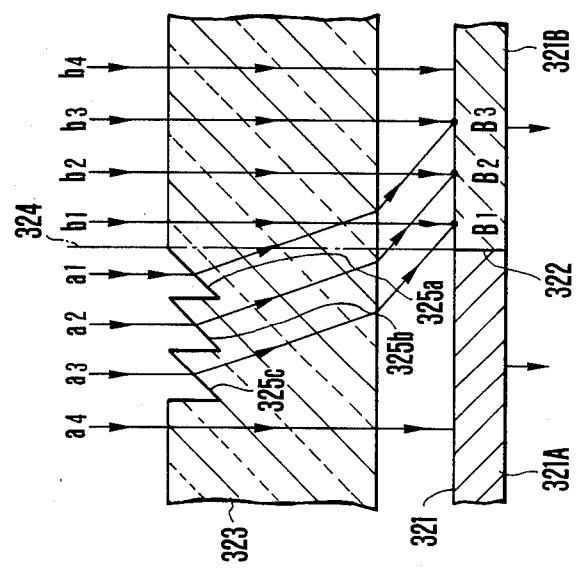

FIG. 16 is an enlarged sectional view as seen from the line I—I of FIG. 14, and FIG. 17 is an enlarged sectional view as seen from the line II—II of FIG. 14.

In FIG. 14, when light beams a1, a2, a3, a4 of the light spot image reflected by the object are incident on the optical member 323 at the left side of the center line 324 of the optical member 323, and light beams b1, b2, b3, b4 are incident on the optical member 323 at the right side, in the part shown in FIG. 16, only the light beams a1, a2, a3 are refracted by the V-grooves 325a, 325b, 325c of the triangles 325. The light beam a1 is incident on a point b3 in the area 321B of the light sensing element 321, the light beam a2 is incident on a point B2, and the light beam a3 is incident on a point B1. The other light beams a4 and b1-b4 are incident straight on the areas 321A and 321b of the light sensing element 321 due to the parallel plane glass. Namely, out of the light beams a1-a4, only the beams a1-a3 incident on the triangle 325 are refracted to be incident on the area 321B of the light sensing element 321.

On the other hand, in the part shown in FIG. 17, only the light beams b1, b2, b3 out of the light beams b1, b2, b3, b4 are respectively refracted by the V-grooves 326a, 326b, 326c of the triangle 326. The light beam b1 is incident on a point A3 in the area 321A of the light sensing element 321, the light beam b2 is incident on a point A2, and the light beam b3 is incident on a point A1, while the other beams b4 and a1-a4 are incident straight on the areas 321B and 321A of the light sensing element 321 in the same way as the case of FIG. 16. Namely, out of the light beams b1-b4, only the light beams b1-b3 incident on the triangle 326 are refracted to be incident on the area 321A of the light sensing element 321.

As mentioned above, even if the boundary of the areas 321A and 321B of the light sensing element 321 is a straight line, the light condensing state can be changed by the shape of the optical member 323 arranged in front of the light sensing element 321. Only the light beams incident upon the boundary having a width of the areas 321A and 321B can be divided with weight and be refracted. As a result, the same dividing effect as that of the construction in which the areas 321A and 321B of the light sensing element 321 run to each other beyond the boundary can be obtained.

In the case of the present embodiment, by arranging an optical member for compensating for the condensed incident light in front of the two areas of the light sensing element as explained above, a focus adjusting device with few misoperations for an object having a large contrast difference can effectively be obtained.

As described above, according to the present invention, by means of the zigzag pattern which divides the boundary line between two areas of the light sensing element, a focus adjusting device which prevents out-of-focus due to the contrast from occurring, can be obtained.

Further, in the case of the embodiment shown in FIGS. 14-17, instead of providing the light sensing element itself with the dividing pattern, it is shown to raise the efficiency of the AF effect by making use of the optical member, whereby the difficulty for producing the light sensing element having a dividing pattern can be solved by providing the optical member with the dividing pattern instead of the light sensing element in order to obtain the same AF effect.

Further, in the case of the embodiment shown in FIGS. 12(a)-12(c) and FIG. 13, the amount of the out-of-focus due to the contrast can further be reduced as compared with the light sensing element of the embodiment of FIG. 11.

Namely, in the case of the comb-tooth type as shown in FIG. 11, when the reflected light spot is projected on the position somewhat deviating from the center of the dividing area, and the duty ratio of the output signal in the dividing area is 50%, the AF lens stops at the position somewhat out of focus due to the contrast.

Contrary to the above, in the case of the embodiment in FIGS. 12(a)-12(c) and FIG. 13, because the duty ratio in each light sensing area in the spot and in the dividing area is large, when the reflected light spot is projected on the position deviating from the center of the light sensing element, the reflected light spot is moved toward the center of the light sensing element, until output signals from the light sensing areas become equal to each other, to make a photographic lens approach the in-focus position. Accordingly, the AF efficiency is effectively improved.

What is claimed is:
1. A distance measuring device comprising:
 (a) light projecting means for projecting distance measuring light toward an object, said distance measuring light being reflected by the object and becoming reflected light;
 (b) sensing means for receiving said reflected light and producing signals relating to a distance to said object, said sensing means having a plurality of sensing zones, wherein a boundary line, forming boundaries between one sensing zone and another sensing zone, forms projections and indentations; and
 (c) computing means for computing a distance to said object based on said signals.
2. A distance measuring device according to claim 1, wherein the number of the sensing zones is two.
3. A distance measuring device according to claim 1, wherein said boundary line has a comb-tooth shape.
4. A distance measuring device according to claim 1, wherein said boundary line is of a zigzag shape.
5. A photographic system comprising:
 (a) a distance measuring device comprising;
  (i) light projecting means for projecting distance measuring light toward an object, said distance measuring light being reflected by the object and becoming reflected light;
  (ii) sensing means for receiving said reflected light and producing signals relating to a distance to said object, said sensing means having a plurality of sensing zones, wherein boundary line, forming boundaries between one sensing zone and another sensing zone, forms projections and indentations;
  (iii) computing means for computing a distance to said object based on said signals; and
 (b) a photo-taking optical system which is movable based on the results of a computation by said computing means.
6. A distance measuring device comprising:
 (a) light projecting means for projecting distance measuring light toward an object, said distance measuring light being reflected by said object and becoming reflected light;
 (b) sensing means having a plurality of sensing zones and at the same time having said reflected light impinge thereon for producing signals relating to a distance to said object;
 (c) optical means provided at an object side of said sensing means for having a portion of light bundles of the reflected light which are directed toward one sensing zone, impinge into another sensing zone; and
 (d) computing means for computing a distance to said object based on said signals by said sensing means.
7. A distance measuring device according to claim 6, wherein said optical means is means for refracting said light bundles.
8. A distance measuring device according to claim 7, wherein said refracting means includes a plurality of inclined planes which are inclined against the impinging direction of the light bundles.
9. A photographic system comprising;
 (a) a distance measuring device comprising;
  (i) light projecting means for projecting distance measuring light toward an object, said distance measuring light being reflected by said object and becoming reflected light;

(ii) sensing means having a plurality of sensing zones and at the same time having said reflected light impinge thereon for producing signals relating to a distance to said object;

(iii) optical means provided at an object side of said sensing means for having a portion of light bundles of the reflected light which are directed toward one sensing zone, impinge into another sensing zone;

(iv) computing means for computing a distance to said object based on said signals by said sensing means; and (b) a photo-taking optical system which is movable based on the result of a computation by said computing means.

* * * * *